Feb. 6, 1968  A. L. NASVYTIS  3,367,214
DOUBLE TOGGLE ACTION PLANETARY FRICTION DRIVE
Filed Feb. 17, 1966  3 Sheets-Sheet 1
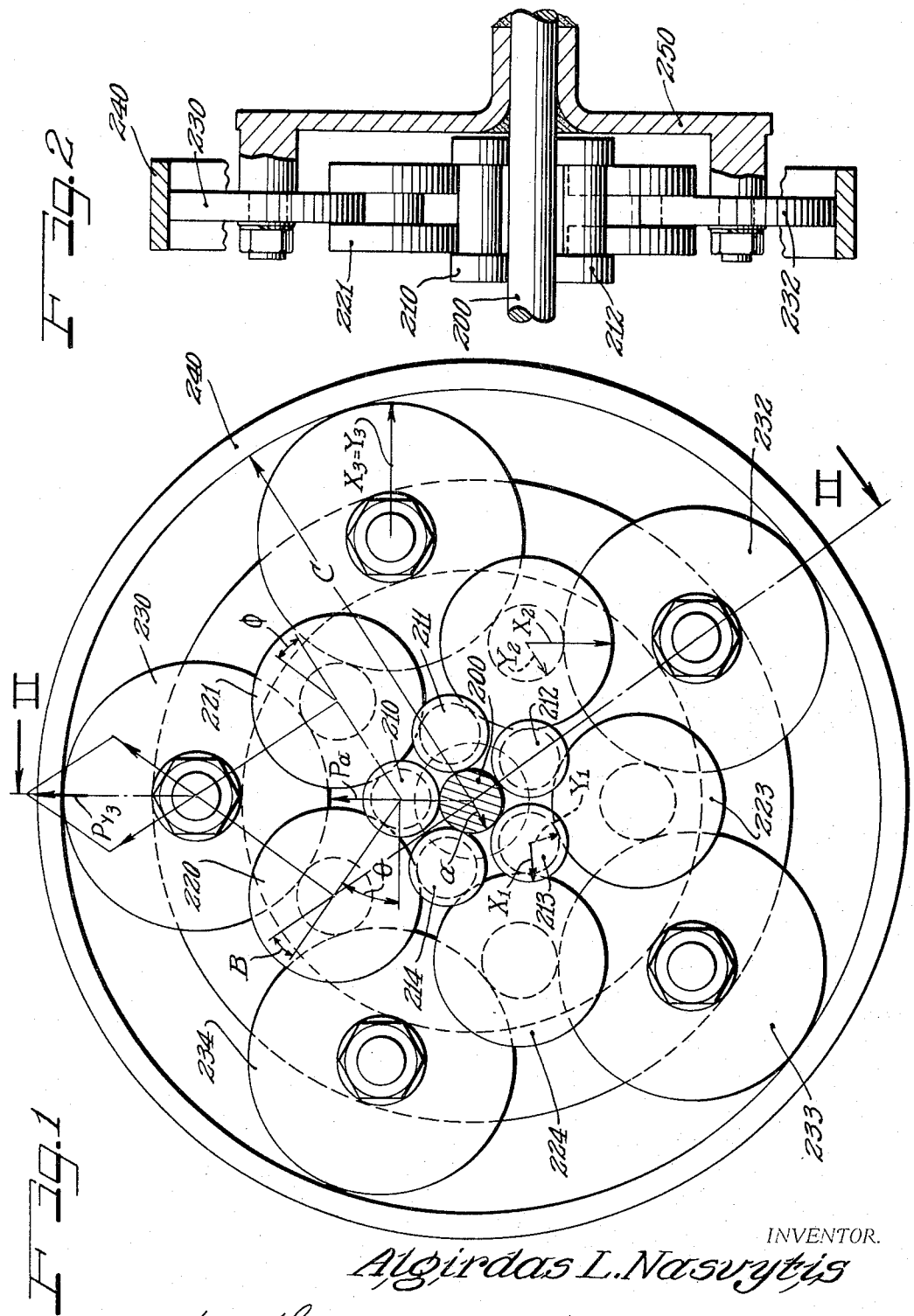
INVENTOR.
*Algirdas L. Nasvytis*
BY *Hill, Sherman, Meroni, Gross & Simpson*
ATTORNEYS

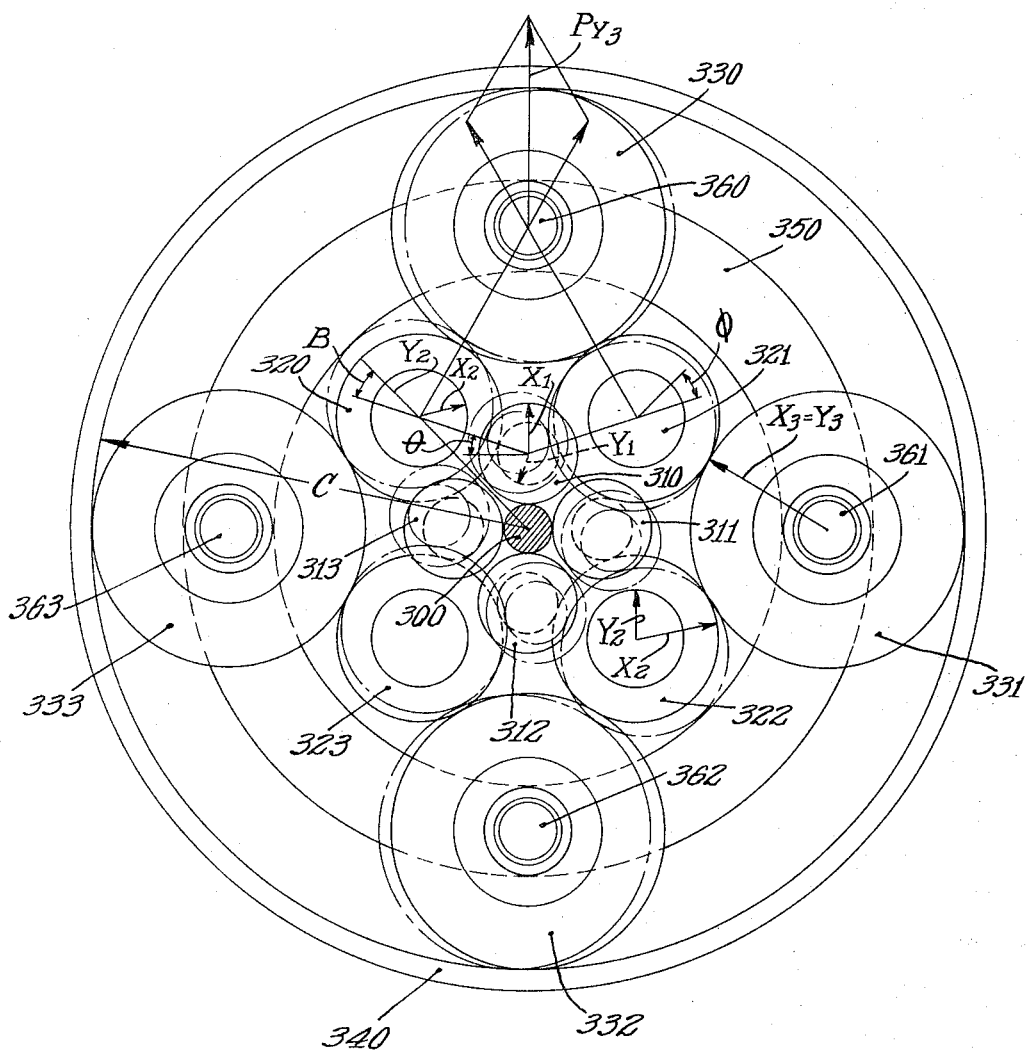

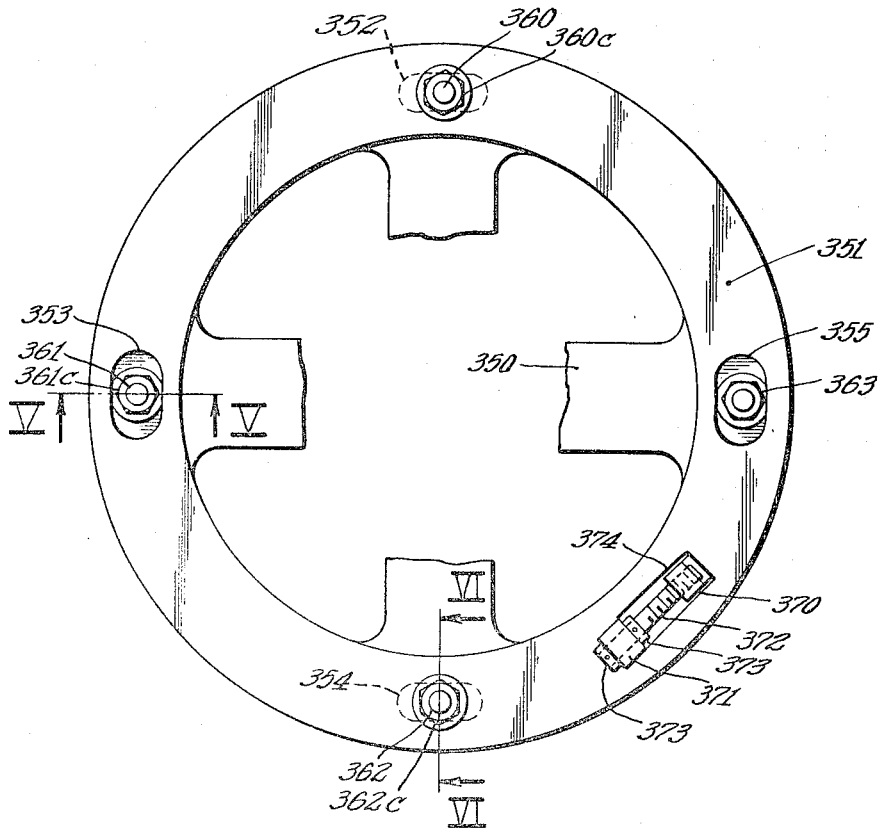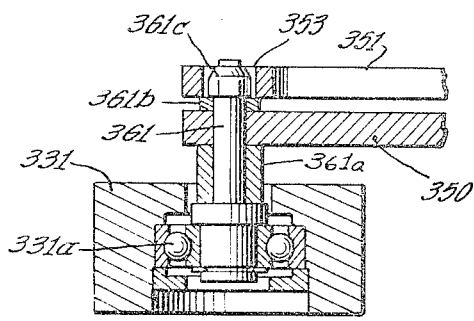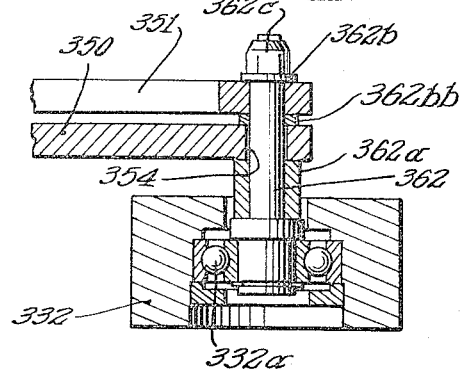

United States Patent Office 3,367,214
Patented Feb. 6, 1968

3,367,214
DOUBLE TOGGLE ACTION PLANETARY
FRICTION DRIVE
Algirdas L. Nasvytis, Cleveland, Ohio, assignor to TRW
Inc., Cleveland, Ohio, a corporation of Ohio
Continuation-in-part of application Ser. No. 237,629,
Nov. 14, 1962. This application Feb. 17, 1966, Ser.
No. 528,181
10 Claims. (Cl. 74—798)

The present invention relates to planetary drive systems and is, more particularly, concerned with the provision of an improved high ratio planetary gear system in which the ratio achievable in a single plane, or stage, is markedly increased over prior devices in a simple and very efficient manner.

This application is a continuation-in-part of my copending application, Ser. No. 237,629, filed Nov. 14, 1962, now Patent No. 3,254,546. In my copending application, Ser. No. 132,406, filed Aug. 18, 1961, now Patent No. 3,216,285, I have described an improved, compound planetary type friction drive. With such drive, and with simple friction planetary gear drive heretofore known, reduction ratios of more than 12 or 15-to-1 were difficult to achieve without utilization of unduly large ring gears. Accordingly, where the outside diameter of the gear reduction unit was a significant design factor, several stages or planetary gear units have been required in series to provide the necessary ratio. The employment of several stages, however, poses design problems which in some cases are more serious than those imposed by increased diameter. For example, it is manifest that two drives in series will increase the total length of the device, the number of bearings employed therein, the weight of the unit and the complexity of the apparatus. Further, the second, or successive, stage of the drive has a much slower rate of rotation and a correspondingly higher torque which, for larger horsepower drives, can provide such a high pressure for friction drive transmission that the design length of the sun cylinder of the second stage must be substantially increased to reduce operating stress to a satisfactory level.

In accordance with the present invention, multiple rollers are provided in plural torque transmitting paths between the sun cylinder and ring cylinder. These multiple rollers are arranged so that all have a balanced pressure and, further, so that the pressure force on the input sun cylinder will be multiplied on the surface of the ring cylinder by the geometry of the contacts of the rollers thereby creating forces analogous to those of a toggle or wedge. In accordance with the present invention, two variations in construction are specifically illustrated, both of which employ three intermediate rows of planets, all rows having the same number of planets. The embodiments each comprise a four-contact drive system in which each roller of the second row of intermediate rollers between the sun cylinder and ring cylinder has contact with two rollers of each of the first and second intermediate rows. In the first embodiment, the preload is fixed upon assembly. In the second illustrated embodiment, adjustable preload is achieved. As a result of the arrangement of the friction gear drive as set forth in the present invention, it is possible to eliminate fixed bearings for all but one row of rollers, which bearings may be fixed or adjustable depending upon the desirability, in given systems, to adjust preload. The total number of bearings necessary in the drive is substantially reduced over conventional systems.

It is, accordingly, an object of the present invention to provide an improved multiple roller power path planetary drive system.

Another object of the invention is to provide a planetary gear drive system employing a toggle action force transmission between friction rollers employed therein.

Still a further object of the present invention is to provide a balanced multiple roller planetary drive system wherein the rollers positioned between the sun and the ring are positively located by three lines of force application such that locating bearings may be eliminated.

A feature of the invention is the provision of a friction planetary drive having more than one friction roller positioned between the sun and the ring in each power path.

Yet another object of the present invention is to provide a substantially greater ratio change in a single axial stage planetary gear drive.

Another feature of the invention resides in utilization of a novel toggle action to provide a maximum torque transmission efficiency between friction gears in a planetary system.

Yet another feature of the invention resides in the construction of a planetary gear drive employing multiple rollers in each power path arranged to provide three contact lines for force transmission and to adjust force transmitting preload in the system.

Still other and further objects and features of the present invention will at once become apparent to those skilled in the art from a consideration of the attached drawings wherein several embodiments of the present invention are shown by way of illustration only, and wherein:

FIGURE 1 is an end elevational view of a multiple roller double toggle action friction planetary gear system constructed in accordance with the present invention;

FIGURE 2 is a side-elevational view, in cross-section taken along the line II—II of FIGURE 1;

FIGURE 3 is an end-elevational view of a modified form of friction gearing employing double toggle action;

FIGURE 4 is an enlarged end-elevational view of the carrier system employed in the system of FIGURE 3;

FIGURE 5 is a partial cross-sectional view of the carrier taken along lines V—V of FIGURE 4; and FIGURE 6 is a partial cross-sectional view taken along line VI—VI of FIGURE 4.

As shown on the drawings:

Multiple roller row planetary systems are described at length in my copending application Ser. No. 237,629, filed Nov. 14, 1962, of which this application is a continuation-in-part and of which the description of FIGURES 1–4, not here again shown, are here incorporated by reference. As more fully described in that copending application, a double toggle action may be provided in a planetary gear employing three rows of planet roller members. The specific embodiment employing planet sets having $n-2n-2n$ rollers in successive rows or sets of intermediate planet rollers (in rows successively further from the sun) is claimed in that prior application, now Patent No. 3,254,546. Such a system provides three-point contact at each roller of the sets. An advantageous four-point contact system at the second row of rollers may be provided, however, when three or more planet rollers are provided in each row of a three-row system and all rows are equal in planets, i.e., $n-n-n$ where $n=$the number of planets in the first row of planets contacting the sun member.

By providing such an $n-n-n$ relationship in three-row systems, four contacts are provided at the second row. This provides load sharing between two first row rollers and each second row roller. Since the first row rollers are preferably small to provide compactness of the overall system, the distribution of load provides maximum roller life and minimum load per first row roller contact.

A first embodiment of the four-point contact system is shown in FIGURES 1 and 2. There, a double toggle action is achieved with the second intermediate rollers 220 221, 222, 223, and 224, each having four contact supports. For example, roller 220 is in contact with the rollers 210, 214, 230 and 234.

In the embodiment of FIGURE 1, the toggle action on the contact $y_1-x_2$ is $$P_{y1}=\frac{P_a}{2 \sin \theta}$$

The roller $x$ has two forces which make the angle B with the radius, or $$B=\left(90-\frac{180}{n}\right)-\theta$$

In the case illustrated, $n=5$ and $B=54°-\theta$, and the resultant of these two toggle forces is $2P_{y1} \cos (54°-\theta)$. The force between $y_2$ and $x_3$ is again multiplied by the second toggle action, with $$P_{y2}=\frac{2P_{y1} \cos (54°-\theta)}{2 \sin \phi}$$

Substituting $$P_{y2}=\frac{P_a \cos (54°-\theta)}{2 \sin \phi \sin \theta}$$

Each roller $x_3$ has two forces and the resultant force on the ring-roller contact is, in each case:

$$P_{y3}=P_c=\frac{P_a \cos (54°-\theta) \cos (54°-\phi)}{\sin \theta \sin \phi}$$

and is evenly balanced.

In a system employing an odd number of rollers in each row or set of planet members, the preload is established for each unit by the initial fit of the rollers of the device. In such systems the rollers are all symmetrically balanced and radial movement of any roller is prevented by the presence of others. However, the balance system may be provided with provisions for preload adjustment over a moderate range. An embodiment of such a system is illustrated in FIGURES 3–6 where the even-numbered intermediate rows of planets has been substituted for the odd numbered rows or sets of planets of FIGURE 1.

As shown in FIGURES 3–6, the friction drive comprises sun 300 and ring 340 separated by three sets of $n=$ four planet members, namely first set 310, 311, 312 and 313; second set 320, 321, 322 and 323; and third set 330, 331, 332 and 333.

No bearings are required for supporting the various planet members, except that the planets of one of the three sets are peripherally fixed relative to one another by means of a planet carrier 350 and carrier-supported member 351. The carrier 350 has rigidly secured thereto bearing posts 361 and 363 which in turn pivotally carry, respectively, rollers 331 and 333 by way of any conventional bearing means such as illustrated at 331a in FIGURE 5, for example. As may be seen from FIGURE 5, the bearing posts 361 carries a shoulder 361a and a washer 361b which clampingly engage the carrier 350 upon the application of pressure by nut 361c. Member 351 is provided with a pair of slots 353 and 355 which permit angular rotation of the ring 351 relative to the carrier 350. Carrier 350 has a pair of related slots 352 and 354 which cooperate with the respective bearing studs 360 and 362 to permit angular rotation of the carrier 350 relative to the studs 360 and 362. Rotation is permitted, as may be clearly seen from FIGURE 6, since the studs 360 and 362 are rigidly secured to the ring 351 by the clamping action of shoulder 362, washers 362b and 362bb under the influence of nut 362c. Studs 362 and 360 carry, respectively, rollers 332 and 330 by way of roller bearings such as, for example, 332a illustrated in FIGURE 6. It will be seen that by loosening nuts 360c and 362c, the planet members 330 and 332 may simultaneously be moved respectively closer to roller planet members 331 and 333, at which time the nuts 360c and 362c may be reclamped and a fixed adjustment provided. Incremental adjustments may be accomplished by means of a tang 370 struck from carrier 350 and tang 371 struck from member 351 with an adjusting screw 372 threaded in tang 370 and pivotally retained in tang 371 by shoulders 373. Adjustment of screw 372 causes the abutment 370 to move back and forth within slot 374 of member 351. Adjustment of screw 372 is undertaken when the nuts 360c and 362c are loose. Although not shown, carrier 350 is attached to an output sleeve shaft concentrically carried relative to sun shaft 300. With this arrangement, the carrier 350 may be employed as the output of a sun-driven system in which the ring gear is fixed or, alternatively, the carrier 350 may be braked with the ring 340 being employed as the planetary output.

From a consideration of FIGURE 3, movement of the planet members upon adjustment of the carrier member 350 and 351 may be readily understood. Thus, as rollers 330 and 331 are moved toward each other into the dot-dash line positions with similar movement of rollers 332 and 333 toward each other, the second row rollers 321 and 323 shift also. With such relative movement of rollers 330, 331, 332, and 333, the distance between rollers 331 and 332 will increase, as will the distance between the rollers 330 and 333. Accordingly, rollers 322 and 320 will move to the dot-dash line condition. Simultaneously, rollers 310, 311 and 312 and 313 will shift, remaining in contact with respective rollers 320, 321, 322, and 323, and pulling away from sun 300. This movement of the planet members may be seen from the slightly shifted circles, shown in FIGURE 3 in dot-dash line. Accordingly, it may be observed that as the rollers are shifted away from the completely symmetrical balanced condition, the load on the sun 300 will be decreased. Accordingly, the unit may be assembled with the planet rollers asymmetrically located and the adjusting screw 372 adjusted to bring rollers 330, 331, 332 and 333 in continuously closer balanced symmetrical form with closer to equidistant spacing between the respective support bearings. This movement will increase the preload of the system toward a maximum. If the maximum available in any given assembly is insufficient, the adjusting screw 372 may be adjusted in the reverse direction to loosen the preload and a slightly larger sun shaft 300 may be inserted. This arrangement permits the simple selection of components for any given planetary assembly to provide the desired preload for a given torque requirement.

It will thus be seen that I have provided a novel friction planetary gear system capable of providing a very substantial reduction in ratio with only a single axial stage of gearing. The device is capable of carrying extremely high loads in a completely frictional form. It will be apparent to those skilled in the art that the adjusting screw 372 may be replaced by an automatic control mechanism for adjusting members 350, 351 relative to each other in response to speed or torque transmitted. It will be clear also that further variations and modifications may be made in the structure described without departing from the scope of the novel concepts thereof. It is, accordingly, my intention that the invention be limited solely by the scope of the hereinafter appended claims.

I claim as my invention:

1. In combination in a friction planetary drive, a sun cylinder member, a ring cylinder member, a set of intermediate planet members comprising a number $n$ more than two cylinders equally spaced around said sun cylinder and in friction contact therewith, additional intermediate planet members drivingly interposed between the members of said set and said ring cylinder and equally spaced around said sun cylinder, said additional intermediate planet members including a second set of $n$ intermediate planet members positioned relative to the members of said first set in friction drive relation thereto and a third set of $n$ intermediate planet members positioned between said second set and said ring cylinder in friction drive relation with said ring cylinder and said second intermediate set.

2. In combination in a friction planetary drive, a sun cylinder member, a ring cylinder member, a set of intermediate planet members comprising $n > 2$ cylinders equally spaced around said sun cylinder and in friction contact therewith, additional intermediate planet members drivingly interposed between the members of said set and said ring cylinder and comprising $n$ cylinders each of which is in friction contact with two of the members of said set, and further intermediate planet members comprising $n$ cylinders drivingly interposed between said additional members and said ring cylinder member whereby each of the additional intermediate planet members is provided with four points of friction drive contact.

3. The structure of claim 2 wherein $n$ is an even number at least as great as 4.

4. The structure of claim 3 including means peripherally fixedly locating one of said sets of planet members relative to each other.

5. In combination in a friction planetary drive, a sun cylinder member, a ring cylinder member, a set of intermediate planet members comprising more than two cylinders equally spaced around said sun cylinder and in friction contact therewith, and additional intermediate planet members drivingly interposed between the members of said set and said ring cylinder, said additional intermediate planet members each having friction drive relation with said ring member and two of the intermediate planet members of said set, each of said planet members having two effective friction drive diameters the largest of which is in drive relation with a member closer to the axis of rotation of said sun cylinder than said last-named planet member and the smaller of which is in drive relation with a member further away from said axis of rotation of said sun member, a further additional set of planet members each of which members is in friction contact with said ring cylinder and two of said additional intermediate planet members, and means peripherally fixing the planet members in one of the additional sets relative to each other.

6. The drive of claim 5 wherein the number of planet members in each said set is at least four and comprises an even number.

7. In combination in a friction planetary drive, a sun cylinder member, a ring cylinder member, a set of intermediate planet members comprising $n > 2$ cylinders of a number $n$ at least as great as 4 equally spaced around said sun cylinder and in friction contact therewith, additional intermediate planet members drivingly interposed between the members of said set and said ring cylinder and comprising cylinders each of which is in friction contact with two of the members of said set, and further intermediate planet members comprising cylinders drivingly interposed between said additional members and said ring cylinder member whereby each of the additional intermediate planet members is provided with four points of friction drive contact, and means peripherally fixedly locating one of said sets of planet members relative to each other, said last named means comprising a planet carrier and including adjustment means for peripherally adjusting alternate pairs of rollers peripherally closer to each other.

8. In combination in a friction planetary drive, a sun cylinder member, a ring cylinder member, a set of intermediate planet members comprising more than two cylinders equally spaced around said sun cylinder and in friction contact therewith, and additional intermediate planet members drivingly interposed between the members of said set and said ring cylinder, said additional intermediate planet members each having friction drive relation with said ring member and two of the intermediate planet members of said set, a further additional set of planet members each of which members is in friction contact with said ring cylinder and two of said additional intermediate planet members, and means peripherally fixing the planet members in one of the additional sets relative to each other, the number of planet members in each set comprising an even number at least as great as 4 and said last named means comprising a carrier member having bearing means thereon pivotally supporting in peripherally fixed position alternate planets of the peripherally fixed set, and alternate bearing means adjustably mounted relative thereto supporting the remaining planets of said peripherally fixed set to permit the alternate planets to be adjusted toward or away from adjacent rollers to modify the roller preload of said drive.

9. The drive of claim 8 wherein said alternate bearing means is mounted upon a rigid element movable relative to said carrier and simultaneously moved.

10. The drive of claim 8 wherein the planets of the set of intermediate planet members and the first additional intermediate planet members each has two effective friction drive diameters the largest of which is in drive relation with a member closer to the axis of rotation of said sun cylinder than the last named planet member and the smaller of which is in drive relation with a member further away from the axis of rotation of said sun member.

References Cited

UNITED STATES PATENTS

| | | | |
|---|---|---|---|
| 1,106,246 | 8/1914 | Schoedelin | 74—206 |
| 1,117,446 | 11/1914 | Rodefeld | 74—798 |
| 1,190,662 | 7/1916 | Matteucci | 74—798 |
| 1,737,695 | 12/1929 | Zadow | 74—206 |
| 2,950,635 | 8/1960 | Bieger et al. | 74—801 |

FOREIGN PATENTS

| | | |
|---|---|---|
| 485,820 | 11/1917 | France. |
| 966,535 | 3/1950 | France. |
| 112,015 | 1/1919 | Great Britain. |

ROBERT A. O'LEARY, *Primary Examiner.*

THOMAS C. PERRY, DAVID J. WILLIAMOWSKY, DONLEY J. STOCKING, *Examiners.*